Figure 1:
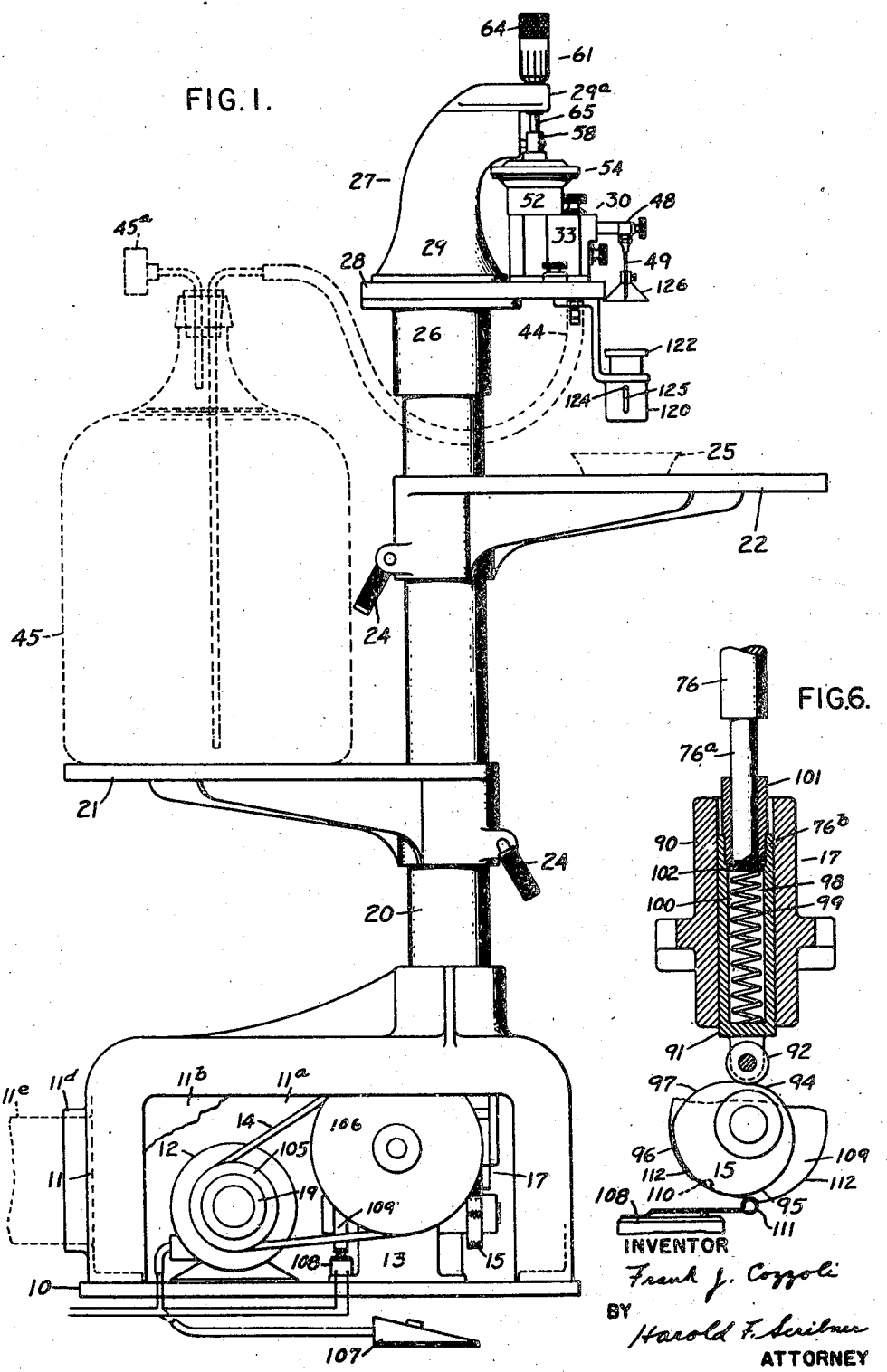

Feb. 11, 1947.  F. J. COZZOLI  2,415,419
FILLING MACHINE
Filed Feb. 29, 1944  2 Sheets-Sheet 1

INVENTOR
Frank J. Cozzoli
BY
Harold F. Scribner
ATTORNEY

Feb. 11, 1947.  F. J. COZZOLI  2,415,419
FILLING MACHINE
Filed Feb. 29, 1944  2 Sheets-Sheet 2

INVENTOR
Frank J. Cozzoli
BY Harold F. Scribner
ATTORNEY

Patented Feb. 11, 1947

2,415,419

UNITED STATES PATENT OFFICE 2,415,419

FILLING MACHINE

Frank J. Cozzoli, Plainfield, N. J.

Application February 29, 1944, Serial No. 524,417

17 Claims. (Cl. 103—38)

The present invention relates to improvements in filling machines of a character suitable for use in filling small containers such as glass tubes, ampules, vials, small bottles and the like, with medicinal, surgical and pharmaceutical supplies and preparations. The invention is concerned more particularly with an improved apparatus and means for delivering a definite measured quantity of a preparation in an uncontaminated condition into containers of such type.

A primary aim of the invention is to obtain and maintain a sterile condition within and about the filling apparatus, to the end of eliminating the possibility of introduction of foreign matter into the preparation and the container during the course of the flow of the preparation through the apparatus during the filling of the small vials, e. g., ampules, from a bulk supply.

A further aim of the invention is to render it possible to fill tubes and like containers, with a measured quantity of the preparation so that irrespective of irregularities in the shape and capacity of a given container, one is assured that such container will contain the requisite amount of the preparation. Frequently, medicinal preparations are packaged for the doctor in sealed tubes, each supposedly containing an amount of the preparation in concentrated form, which alone or when admixed with other solutions and administered to the patient, is to be the correct dosage. Should the container actually contain less or more than the prescribed number of units of the preparation, the possibility exists of unknowingly administering an overdose or an insufficient dose to doctor a given ailment or condition. The present invention undertakes to provide a filling machine wherewith the exact quantity of the preparation, measured in units, e. g., cubic centimeters and fractions thereof, is delivered to the interior of the container with the assurance that every such container of a series will receive such prescribed quantity or number of units of the preparation thereby to attain certainty in the strength of the unit doses as and when administered.

By way of additional refinement, the invention aims to overcome a difficulty heretofore encountered in filling machines which has to do with the tendency of one or more drops of the liquid preparation to adhere to the end of the filling needle. Such adhering drop or drops are, not only subtractive from the prescribed quantity intended to be inserted in the container, but upon removal of the needle, the adhering drops wet the throat of the container. Such wetting is a disadvantage and interfers with the sealing, especially if the filled containers are subsequently sealed by fusion. Moreover, the drop that adheres to the needle becomes exposed to the surrounding air and the possibility of contamination is ever present. By the present invention, such difficulties and the disadvantages flowing therefrom, are eliminated in a way that insures the depositing of the entire measured quantity of liquid into the container, so that none is left upon the needle to wet the throat of the container or to be subject to contamination.

Still another aim of the invention is to render available a device for measuring a liquid medium in which all parts thereof that are contacted by the medium may be readily removed from the main frame of the machine for cleaning and sterilization without disturbing the actuating parts or the setting of the mechanism that is provided for precision controlling the delivery capacity of the filling unit.

A further objective of the invention is to avoid waste incident to splashing of the preparation out of the container during the filling operation and to provide a filling machine, capable of power operation insofar as its measuring function is concerned but which operates to effect a gravitationally controlled discharge of the measured product into the container. With the aid of this invention, the rate of flow of the product out of the filling needle is never so great as to effect a splashing or rebounding of the liquid out of the container during the filling operation. The invention also comprehends a filling machine capable of operation in cycles at selectively different rates of speed not only to suit specific conditions existing where the filling machine is to be operated, but also so as to render the machine capable of handling various preparations having different viscosity values.

In attaining the objectives of this invention it is proposed to construct the main body of the apparatus and all parts thereof which may be or become in contact with the preparation to be handled, of stainless steel or like resistant and durable material capable of being machined to close limits and of withstanding sterilizing temperatures. The body is bored to receive a measuring piston and cylinder and also bored to provide communicating inlet and discharge conduits and valve seats closely adjacent the cylinder. The compact arrangement of ports, valves, and cylinder, leaves little space within the body between the discharge strokes of the piston for retention of the fluid being handled, and consequently very little fluid is lost when changing over the machine from one preparation to another. The close arrangement of parts also promotes lightness in the weight of the unit and facilitates the handling during removal of the unit for cleaning and sterilization.

The bottom end of the measuring cylinder is preferably flat and likewise is the adjacent end of the cooperating piston, so that the piston, on its gravity propelled down stroke, can discharge the full content of the cylinder and "bump" against the bottom wall thereof. The upper end of the cylinder communicates with a closed interior of a diaphragm housing, the resilient diaphragm of which, closely encircles the piston rod and effectively prevents external air from entering the cylinder and being carried along the wall of the piston to the chamber below the piston. The diaphragm in the instant embodiment, is an impervious disc made of thin rubber clamped around its outer periphery between upper and lower halves of the housing. The center of the disc is provided with a small hole through which the actuating rod of the piston extends, the latter being grooved intermediate its ends to act as a retainer for the central portion of the flexible diaphragm. In such manner the normally open end of the cylinder is closed to the atmosphere by the impervious diaphragm, and the use of a stuffing box about the piston rod and the difficulties attending stuffing boxes in an apparatus of this kind, are eliminated.

The diameter of the piston and cylinder and the length of its reciprocatory stroke capable of being imparted to the piston are preferably proportioned such that a full stroke of the piston will draw in and discharge a predetermined number of units of the preparation, for example, 15 cubic centimeters, and by limiting the length of the stroke, the number of units drawn in and then discharged will also vary in direct relation. A preferred structure for accomplishing this result comprises a mechanism, located preferably at a remote distance to avoid disturbing the air in the immediate vicinity of the filling unit, adapted normally to lift the piston from its bottom position to its maximum upper position but so constituted that, as occasion requires, all or only a selected portion of the lifting stroke of the mechanism is rendered effective to lift the piston. In the handling of small quantities of liquid, it will readily be perceived that a few drops more or a few drops less, than the quantity predetermined as correct, often results in a wide variation, in terms of percentage, in the strength of the dose contained in the vial. An ordinary variable stroke actuating mechanism for the plunger of a filling machine for this purpose, is not entirely satisfactory because of unavoidable backlash between the various transmitting members. Likewise, inertia of the parts, notably the piston, also tends to effect an over movement and consequential variations in the amounts discharged into the vial or tube result.

Certainty in the distance the piston is moved in the present filling machine is obtained by arranging an adjustable stop directly in the path of the piston movement, and by providing a yieldable connection in the piston actuating train operative to permit the actuator to move through its maximum distance even though the extent of piston movement resulting, is definitely limited, to something less than the maximum distance. A filling machine embodying this principle of construction and operation is thus rendered not only eminently suitable for filling small containers with prescribed measured quantities of the product, but also adaptable for quick and easy disassembling for sterilization.

Other objects and advantages will be in part indicated in the following description and in part rendered apparent therefrom in connection with the annexed drawings.

Figure 6:
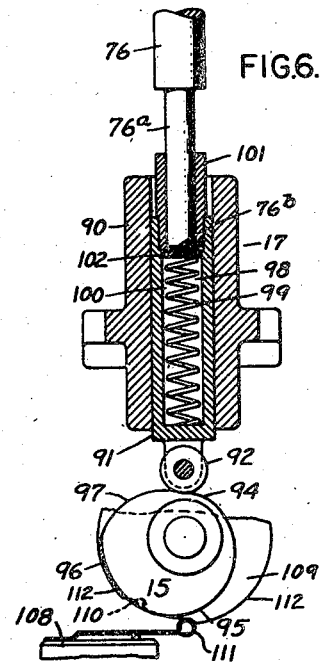
Figure 3:
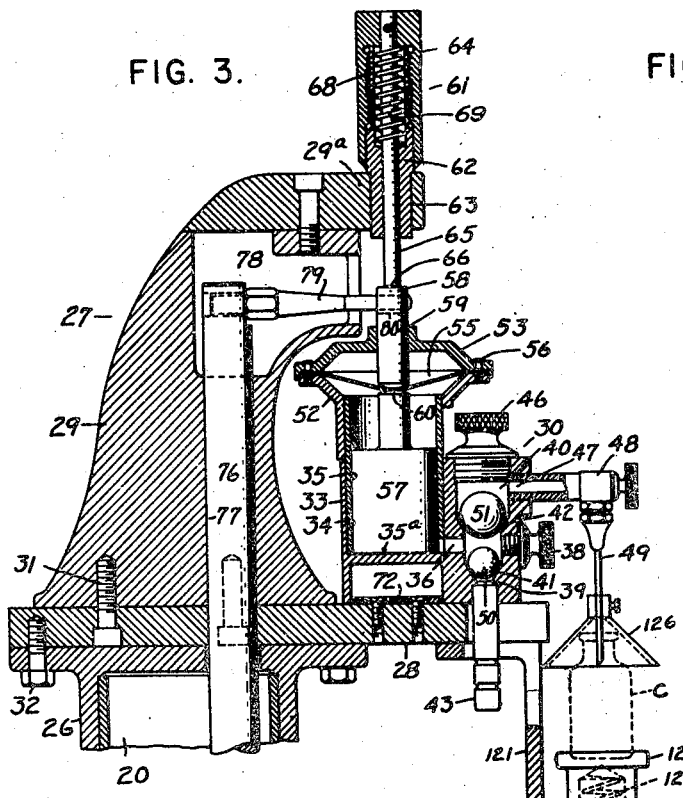
Figure 2:
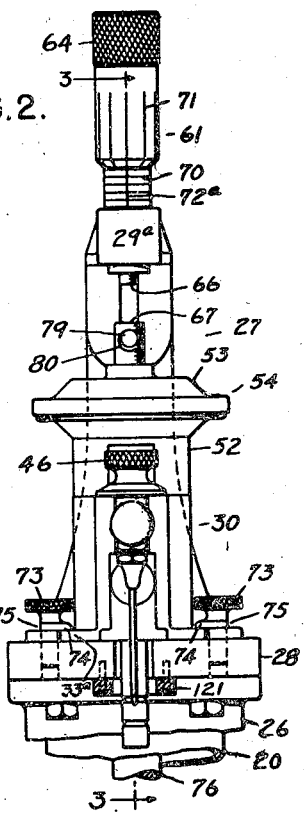
Figure 5:
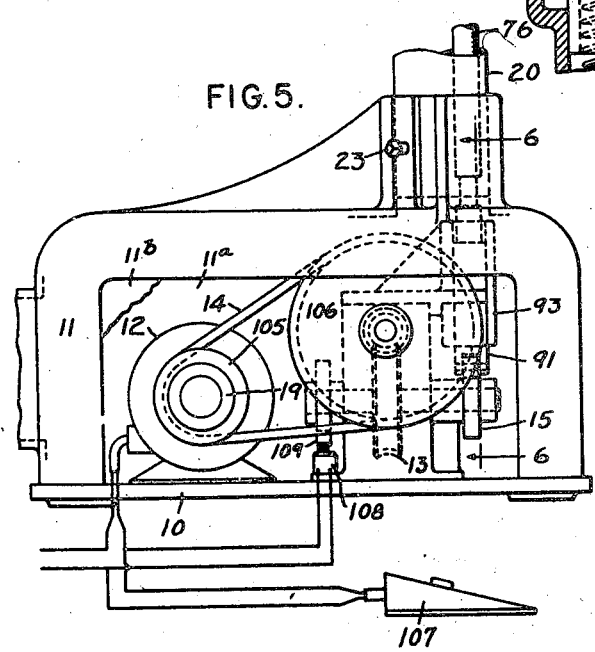
Figure 4:
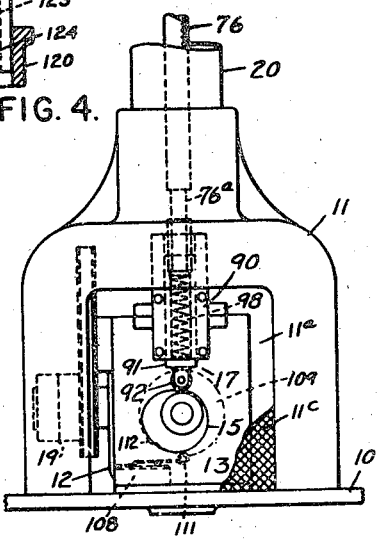

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Figure 1 is an elevational view of a filling machine embodying this invention. Fig. 2 is an enlarged front elevation of the filling head of the machine illustrated in Fig. 1. Fig. 3, a vertical sectional view of the filling unit taken substantially along line 3—3 of Fig. 2. Fig. 4 is a front view of the base portion of the machine illustrating a preferred form of actuating means for the measuring plunger. Fig. 5 is a side view of the base portions. Fig. 6 is a sectional view substantially along line 6—6 of Fig. 5.

Referring more particularly to Figure 1 of the drawings, the invention is disclosed as embodied in a floor type machine having a flanged base 10, to which a transmission housing 11 is secured. The housing encloses a variable speed drive transmission comprising a motor 12, a worm and worm wheel speed reducing unit 13 connected with the motor by a V-belt 14, a piston actuating cam 15 secured to the output shaft 16 of the reduction unit 13, and a cam follower roller and guide means indicated generally as 17. Preferably one or both of the pulleys 105 and 106 tracked by the belt 14, is of the variable pitch type, and capable of adjustment to vary the rate of rotation of the cam, by means indicated generally as 19. If only one variable speed pulley is used, the motor ordinarily, will be equipped with a sliding base (not shown). Openings 11$^a$ formed in the side walls of the housing 11 are of such size as to permit convenient assembling and adjustment of the mechanisms. With a view toward maintaining a quiet and aseptic condition of the air about the apparatus such openings 11$^a$ are normally closed by panels 11$^b$ at the sides, a grill 11$^c$ at the front, and an exhaust port 11$^d$ provided at the rear to enable a connection to be made to an exhaust system 11$^e$ for withdrawing disturbed and contaminated air from the room and from the apparatus.

Normally the motor, pulleys, and cam mechanisms, above mentioned, are in motion and tend to agitate the surrounding air. By locating the main moving elements at a distance from the filling unit, the air currents produced by the moving elements, do not appreciably disturb the air around the filling unit and the likelihood of contamination of the preparation from the air is further reduced.

The upper wall of the transmission housing is fashioned to receive and support, a tubular vertically extending column 20, along which shelf members 21 and 22 are vertically adjustable. Clamp screws 23 and 24 are provided, respectively, to clamp the column in adjusted position vertically to the transmission housing, and to clamp the shelf members in vertical or angularly adjusted positions on the column. The shelf 21, at the rear of the column, affords a support for a bulk container 45 of the product that is to be placed in the small containers c (Fig. 3), whereas, the shelf 22 at the front of the column affords an adjustable table on which a box of the empty tubes to be filled may rest, and a drip pan 25, should such a pan be considered necessary.

At the top of the column, above the shelves 21 and 22, there is mounted a bracket 26 to which a filling machine head unit indicated generally as 27, is removably mounted. The head unit 27 comprises essentially a stainless steel base plate 28, a support 29 (preferably enameled) and a stainless steel filling unit 30. Screws 31 are provided to secure the base plate 28 and the support 29 together as a unit, and screws 32 provided for removably securing that unit to the column mounted bracket 26.

The filling unit 30 comprises a flanged body member 33, bored as at 34 to provide a cylindrical opening that receives a measuring cylinder sleeve 35. The body is also transversely bored, as at 36, to form a common supply and discharge conduit communicating with the inside of the bore and cylinder 34, 35 near the bottom thereof. The conduit 36 is closed at its forward end by a knurled screw 38. At one side of the cylinder 35, the body member is also bored and counterbored to form supply and discharge passageways 39 and 40, and conical intake and discharge valve seats 41 and 42, all communicating with the common conduit 36. The intake passageways and valve seat 39 and 41 are below the conduit 36, and the discharge valve seat and passageway 40 and 42 are axially aligned above the common conduit 36. The intake passageway 39 is furnished with a nipple 43 to which a connecting hose 44 leading to the source of supply 45 is removably secured. The bulk container is preferably equipped with a conventional filter 45ª.

The discharge passageway 42 is closed at the upper end of the body 33 by a knurled screw 46, but below the screw and above the discharge valve seat 42, a connection 47 is made with a filling nipple 48 and removable filling needle 49. Ball valves 50 and 51 control the flow into and out of the common conduit 36 and automatically prevent flow reversals in the intake and discharge passages 39 and 40. In this connection, it is to be noted that very little pressure is required to lift the valves off their respective seats and, therefore, the level of the bulk supply 45 should not be at a higher elevation than the valve 50 if leakage and possible syphoning effects are to be avoided.

The piston cylinder sleeve 35 has a press fit into the body 33 and projects above the body and provides a mounting for the lower member 52 of a diaphragm housing 54. The upper member 53 of the diaphragm housing overlays the lower member and the two members clamp therebetween a resilient diaphragm 55. Screws 56 spaced about the margin of the housing clamp the three parts together as a unit capable of being mounted upon or removed, as such, from the projecting portion of the cylinder 35.

Within the cylinder a reciprocable piston 57 is fitted, and the piston rod 58 thereof extends through an opening in the diaphragm 55 and freely through a guide bearing 59 provided by the cover 53 of the housing 54. The piston rod is annularly grooved as at 60 intermediate its ends and retains therein, in snug relation, the surrounding portion of the diaphragm 55. Within the normal extremes of piston movement, the diaphragm tightly grips the grooved rod and effectively seals the piston cylinder against entrance of foreign matter, and permits the piston to travel from one extreme position to the other without disturbing the seal. I have found that a diaphragm made of sheet rubber is highly effective as a seal and withstands ordinary sterilization temperatures over a considerable period. Synthetic rubber, plastics, treated fabrics and metal may, of course, be used if desired.

Above and coaxially related with piston rod 58, a micrometer stop mechanism 61 is mounted to the support 29. The stop mechanism comprises a sleeve member 62 that is pressed tightly into a bore 63 formed in an over hanging portion 29ª of the support 29, and a knurled outer sleeve 64 which has pinned thereto a micrometer stem 65. The stem 65 projects through the sleeve 62 to a position where its end 66 can be engaged by the upper end 67 of the piston rod 58 and so limit the upward movement of the piston. Screw threads 68 between the inner and outer sleeves 62 and 64 of the micrometer stop are provided to effect endwise adjustment of the end 66 of the micrometer stem 65. The pitch of the threads 68 of the micrometer is, preferably, related to the linear capacity of the pump cylinder which, in turn, bears a definite relation to the size of the unit dose to be injected into the glass tube or bottle. For example, in the apparatus disclosed, the piston has an available stroke of approximately .600 inch, and a diameter of approximately 1.400 inches. On a full stroke, the piston will draw in and discharge 15 c. c. of the preparation, each 1/6 stroke (.100") of the piston equaling 2½ c. c. of the preparation. Therefore with a screw of 10 threads per inch in the micrometer, each complete turn of the outer sleeve 64, raises or lowers the abutment stem 65, 1/10 of an inch and effects a change of 2½ c. c. in the discharge capacity of the filling unit. The exterior of the inner sleeve 64 is annularly scribed with spaced lines 70 which coact with the beveled lower end of the sleeve 64 and indicate the aforementioned major variations in quantity. The exterior of the outer sleeve is scribed vertically with numbered lines 71 which coact with a vertical line 72ª on the inner sleeve 64 whereby fractional turns of the micrometer subdivides the major calibrations into unit changes of .5 c. c. and .10 c. c., as may be desired. A compression spring 69, operating between the inner sleeve 62 and the outer sleeve 64, maintains the two sleeves in adjusted relation, yet permits manual adjustments to be made with comparative ease.

Ordinarily, however, a filling unit having the capacity mentioned will not be used to fill tubes with relatively small quantities of a preparation, and for filling tubes with such small quantities another filling unit having a correspondingly smaller diametered piston will be used in place of the larger one.

Interchangeability of filling units is effected by securing a locating disc 72 to the plate member 28 in alignment with the micrometer stop 61, and complementally recessing the under side of the filling unit. Clamp screws 73 positioned at each side of the body member 33 provide a means for clamping the unit 30 to the supporting plate after it is located on the disc 72. Each clamp screw 73, as illustrated in Fig. 2, has a portion of its flange 74 cut away as at 75. A part turn of the screw will unclamp the body from the plate and bring the cut-away side of the screw, vertically over the flange 33ª of the body member, and thus permit easy removal or replacement of the filling unit over the locating disc 72.

A preferred form of means for lifting the piston 57 comprises a reciprocable bar 76 that extends axially within the column 20 and guided near its upper end in a bearing 77 provided in the support 29. The support is recessed, as at 78, and houses an actuating finger 79 that is screwed into the rod 76. The finger 79 projects laterally from the rod and enters a hole 80 in the piston rod 58. The hole in the piston rod is slightly larger than the finger 79 so that the latter cannot exert any side stress on the piston, which might interfere with its free movement, and so that the filling unit can be easily lifted off the forward end thereof when removing the unit from the machine for sterilization or replacement.

The actuating rod 76 extends downward through the column and is guided at its lower end in the guide means 17 previously mentioned. Referring more particularly to Figs. 4, 5, and 6, the guide means 17 comprises essentially a bearing bracket 90, secured to the reduction gear housing 13. The front portions of the bracket is channelled to receive a square bar 91 that mounts a cam follower roller 92 at one end and receives a reduced end portion 76ª of the actuating rod 76 at its other end. The open side of the channel in the bracket is closed by a cover plate 93 screwed to the marginal portions of the bracket. The axis of the follower 92 parallels the axis of the cam 15, and the square mounting of the block 91 maintains that relation while allowing the follower and block to raise and lower in response to the lifting action of the cam 15.

As illustrated in Fig. 6, the cam 15 has a concentric low portion 94, a uniform, slowly progressing, lifting portion 95, a concentric high portion 96, and a uniform, but relatively fast, dropping portion 97. When the follower roller is on the low portion 94, the piston 57 of the filling unit is in its lowest position abutting the end wall of the cylinder; as the cam rotates (counterclockwise in Fig. 6), the roller 92 is caused to lift along portion 95 of the cam and the piston 57 is lifted; when the high portion 96 of the cam is reached, there is a short dwell period for the elevator rod and the piston; and when the descending portion 97 of the cam is reached the roller drops relatively quickly and allows the rod 76 and piston 57 to fall by gravity. Thus, the piston actuating mechanism of this invention effects mechanical shifting of the piston on its suction stroke whereby the liquid preparation to be metered is caused to enter the cylinder, through the valved inlet passage 39, and a gravitational shifting of the piston on its expelling stroke, whereby the measured quantity of the preparation is discharged at a moderate rate through the valved discharge passage 40 and the needle 49. The ball valves 50 and 51 alternately open and close their respective passageways during the pumping action, as will be understood.

The angular length of the dwell portion 94 on the cam 15 is, in this embodiment, 45° which affords ample time for completion of the gravity discharge. Should the rate of discharge, with certain liquids, be relatively fast, the descending portion 97 of the cam 15, which in the embodiment illustrated is 90° in angular length, limits the rate of fall of the piston and the discharge rate cannot exceed the rate predetermined by the portion 97 of the cam. The concentric portion 96, at the high portion of the cam, affords, if needed, a reserve time period during which the filling of the cylinder on the suction stroke of the piston 57 may be completed. In the apparatus disclosed the ascending portion 95 of the cam is 180° in angular length, and the concentric high portion 96 of the cam is 45° in angular length. A cam so proportioned operates a machine of this character in an efficient manner. The contour of the cam may, of course, assume a different configuration to suit a special product or condition.

Cooperatively related with the micrometer stop abutment mechanism 61, and associated with the piston lifting mechanism, is a yield device 98, herein illustrated as a spring 99 interposed between the lower end of the actuating rod 76 and the follower roller guide block 91. The block 91 is longitudinally recessed, as at 100, and houses the compression spring 99. A sleeve type of bushing 101 is threaded into the block 91 and closes the upper end of the recess 100 and places an initial load upon the spring of a value approximately equalling the combined weight of the actuating rod 76 and all the parts carried thereby, i. e., finger 79 and piston 57 and piston rod 58. At the underside of the bushing 101, a disc 102 is placed, upon which the reduced end 76ª normally rests and against which the spring 99 reacts. The bushing 101 encircles the reduced end 76ª of the actuating rod and affords a relatively long bearing therefor. With the micrometer set to permit the piston to move upwardly a full stroke, the cam 15 and yield means 98 will effect such full stroke movement. However, when the micrometer is set to limit the movement of the piston to less than its full stroke, the cam 15 and yield means 98 will move the piston until its end abuts the micrometer stem 65, after which, the spring 99 will yield for the remaining portion of the throw of the cam 15. On the down movement of the cam follower 92, the spring 99 first expends its excess compression against the bushing 101 and thereafter the rod 76 drops with the guide block 91. At the extreme end of the downward movement, the guide block 91 drops slightly away from the end of the rod 76ª leaving a small space 76ᵇ therebetween, to insure the full weight of the rod being applied on the measuring plunger 57 at the end of the discharge stroke.

A normally open switch 107 is provided for initiating the operation of the drive motor 12. However, cooperatively related with the starting switch 107 is another normally open switch 108 whose function is to continue the motor in operation until the completion of a filling cycle, even though the operator releases the switch 107. In this arrangement shown in Figs. 5 and 6, the holding switch 108 is connected in a shunt circuit around the starting switch 107, and actuated by a cam 109 connected to the reduction gearing drive shaft in phase relation with the elevating cam 15. The cam 109 has a low portion 110 which starts coincidently with the point of beginning of the dwell portion 94 of the elevating cam 15, and ends approximately coincidently with the point of beginning of the lifting portion 95 of the cam. Thus when the plunger 57 is down and the contents of the measuring cylinder has been discharged, the switch 108 is open and remains open until the lever mounted roller 111 thereof is engaged and depressed by the high portion 112 of the cam 109. The switch 108 is thereupon moved to its closed position and remains closed during the remainder of the filling cycle. The closing of the starting switch 107, starts the motor in operation, and shortly thereafter, the switch 108 closes and continues the motor in operation. Meanwhile, the operator can release his foot from the starting switch 107, and when the filling cycle has been completed, the switch 108 opens and the motor stops. Thus the apparatus may be brought to rest at a definite point in the filling cycle, namely, after the completion of one and before the start of another, to insure the complete filling of the final container. Continuous cyclic operations are effected by holding the switch 107 closed, the operator coordinating container transfer operations in synchronism with the timing of the operational cycle of the apparatus.

It has been found that a convenient speed of operation of the machine is approximately 20 fills per minute, and under ordinary conditions the cam 15 will be operated at or about that speed. However, there is incorporated a speed varying device, here shown in the form of a conventional variable speed drive pulley 105, so that the rate of fills may be varied, above and below the approximate average rate of 20 per minute. If desired, the reduction gear pulley 106 may also be of the variable pitch type.

To operate the apparatus, the operator will obtain a filling unit, such as 30, from the sterilizer and mount it upon the finger 79 and base plate 28. A container (45) from which the preparation is drawn is mounted upon the rear shelf 21, raised or lowered to the required elevation, and connected to the filling unit by a hose 44. After setting the micrometer (61) for the unit capacity desired, the motor is started by pressing the switch 107. On the up stroke of the piston, the preparation from the vessel 45 is drawn into the cylinder 35, to the preset capacity thereof. On the down movement of the piston, the measured quantity of the preparation is discharged through the needle 49 into the container c held by the operator over the needle.

An important feature of the invention resides in the effect produced by the movement of the piston by gravity. As herein illustrated, the weight of the actuating rod and finger 76, 79, can assist in the lowering of the piston, and in consequence, the contents of the cylinder are discharged at a rate limited only by the resistance to the flow of the fluid through the several passageways and needle 49 and undue splashing of the preparation is avoided. Toward the end of the downward movement, the piston moves at a relatively fast rate and strikes the bottom 35ᵃ of the cylinder with a slight jar and sharp stop and imparts to the fluid column in the passageways and needle 49 a final surge or impulse that effectively removes from the end of the needle the final drop of the preparation that would otherwise cling thereto.

In using a machine of this character, the bottle, vial or tube is held relative to the needle so that the discharge end of the needle extends past the narrowest or most constricted portion of the neck of the bottle. When so positioned, the displaced air escapes through the neck along the filling needle without carrying any of the liquid preparation along with it. When so operated, the final drop from the needle, with an apparatus constructed in accordance with this invention, is discharged into the body of the container, as above explained, and the container is removed with a "dry" neck from a "dry" needle.

One form of holding means for the container c is illustrated in Figs. 1 and 3, and comprises a cup-like support 120 mounted on a slotted bracket 121 removably secured to the platform 28. Within the cup of the support, a vertically movable platform 122 is mounted and normally spring urged, by a spring 123 toward the needle 49. Lateral pins 124 operating in slots 125 of the support limit the extent of upward movement. The platform 122 is depressed to the extent necessary to place a container upon the needle, after which the platform engages the underside of the container c and holds it in the proper elevated position during the filling operation. Meanwhile the operator may be corking or capping the previously filled container and preparing for the next filling operation. A conical hood 126, preferably of transparent material such as "Lucite" or glass, is carried by the filling needle and surrounds the needle and mouth of the container and prevents ingress of bacteria or foreign matter during the filling operation. The hood is adjustable upon the needle so that containers of various sizes may telescope the needle the proper amount. In addition to forming a protecting closure for the container and needle, the conical hood 126 centers the mouth of the container with the needle and acts as a stop collar to limit the extent the needle may penetrate into the container.

Without further analysis the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. An apparatus for measuring a liquid comprising a pump unit having a supply conduit adapted to be connected with a source of supply of liquid medium and a discharge conduit for conveying a measured amount of the medium to a point of use, said pump unit including a measuring cylinder therein having an end wall and a cooperating reciprocable piston, reciprocable means operative through a predetermined fixed stroke for displacing said piston on its suction stroke relative to the end wall of the cylinder to cause the liquid medium to enter the measuring chamber formed in the cylinder on such movement of the piston, means operatively associated with said piston for limiting the response thereof to said reciprocable means to a selected portion of the distance normally available irrespective of the predetermined stroke of the piston displacing means, and gravimetrically operated means independent of said piston displacing means to actuate the piston in a reverse direction to effect the expulsion of the liquid from said measuring cylinder through said discharge conduit.

2. A filling machine comprising a body member having a vertically disposed bore therein, a cylinder in said bore, a vertically movable piston in said cylinder, said body member having a conduit therein communicating with said cylinder at its lower end for conducting fluid into and out of the cylinder, said body member also having a discharge conduit and a supply conduit communicating at a common point with said first mentioned conduit in the body member, valve means in each of said last named conduits operative on an upstroke of said piston to close off said discharge conduit and to open said supply conduit to the cylinder via said first mentioned conduit in the body member and on a down stroke of said piston to close said supply conduit and open said discharge conduit to the cylinder via said first mentioned conduit, piston lifting means operative through a fixed distance and motion yieldable transmitting connections between said means and said piston, and means engageable with said piston for prescribing the limit of upward movement of the piston in response to the action of said lifting means.

3. A filling machine comprising a pump unit having a measuring cylinder and a movable piston in said cylinder, cylinder intake and discharge conduits connected with said unit for conducting fluid into and out of the cylinder, non-return valve means in each of said conduits operative respectively to admit fluid to said cylinder on an intake stroke of said piston and to permit fluid to be discharged from said cylinder on a discharge stroke of said piston, means operative through a fixed distance for actuating said piston on its intake stroke, motion transmitting means connecting said actuating means and said piston, abutment means associated with said piston for stopping the intake stroke thereof at a predetermined point, additional means including gravitational forces for moving said piston on its discharge stroke back to its zero displacement point, and control means for said means operative through a fixed distance.

4. A filling machine comprising a pump unit having a measuring cylinder and a vertically movable piston in said cylinder, cylinder intake and discharge conduits connected with said unit for conducting fluid into and out of the lower end of the cylinder, non-return valve means in each of said conduits operative respectively to admit fluid to said cylinder on an upstroke of said piston and to permit fluid to be discharged from said cylinder on a down stroke of said piston, a cam means having a fixed throw for moving said piston on its suction stroke, motion transmitting connections between said cam means and said piston, means associated with said piston for stopping the upward movement of the piston in response to the action of said cam means at a predetermined point in its available suction stroke, and means in said connections between said cam and said piston for absorbing the excess throw of said cam means on the stopping of the upward movement of the piston actuated thereby.

5. An apparatus for sterile filling a container with a measured quantity of a liquid medium comprising a pump unit having a supply conduit adapted to be connected with a source of supply of liquid medium and a discharge conduit for conveying a measured amount of the medium to the container to be filled, said pump unit including a walled measuring cylinder one end of which is closed and the other end of which is open, and a cooperating reciprocable plunger, said plunger comprising a member having a head portion operable in the said cylinder and forming with said closed end and the side walls of the cylinder an expansible measuring chamber and a connecting rod portion extending through the open end of said cylinder, a housing surrounding said open end of the cylinder, a resilient diaphragm means in said housing and connected with said rod portion of the plunger member to form a seal about the rod end of the plunger and the open end of the cylinder, yieldable means for displacing said plunger in one direction, adjustable abutment means for limiting the movement of the plunger under the action of said displacing means for controlling the capacity of the measuring chamber, means including the force of gravity to effect movement of the displaced plunger in the reverse direction, said last named means in cooperation with said resilient diaphragm effecting a slight rebound movement of the plunger at the completion of the reverse movement of the plunger.

6. An apparatus for sterile filling a container with a measured quantity of a liquid medium comprising a pump unit having a supply conduit adapted to be connected with a source of supply of liquid medium and a discharge conduit for conveying a measured amount of the medium to the container to be filled, said pump unit including a measuring cylinder therein one end of which is closed and the other end of which is open, and a cooperating reciprocable plunger, said plunger comprising a member having a head portion operable in the said cylinder and forming with the closed end and side walls thereof an expansible measuring chamber and a connecting rod portion extending through the open end of said cylinder, a housing surrounding said open end of the cylinder, a diaphragm means in said housing and connected with said rod portion of the plunger member to form a seal about the open end of the cylinder, means for displacing said plunger, and abutment means for limiting the movement of the plunger under the influence of said displacing means but independently of the action of said displacing means to predetermine the effective capacity of the measuring chamber.

7. In a filling apparatus the combination of a pump unit, said unit comprising relatively reciprocable piston and cylinder members and a fluid inlet and a fluid discharge conduit communicating with the cylinder, normally positive acting means for effecting relative movement between said piston and cylinder members in one direction whereby fluid is caused to enter the said cylinder, gravity operated means for effecting relative movement between said piston and cylinder members in the opposite direction whereby the entrained fluid is discharged from the cylinder, abutment means operatively associated with one of said relatively reciprocable members for prescribing the limit of movement imparted thereto by said means for effecting relative reciprocation, and micrometer means for adjusting said abutment means to effect a given displacement capacity of the unit.

8. The combination set forth in claim 7 in which said means for effecting relative movement includes a rotatable cam member having concentric low and high portions connected by intervening ascending and descending portions and a movable cam follower adapted to track said portions.

9. The combination set forth in claim 7 in which said means for effecting the first mentioned relative movement includes a normally effective but yieldable motion-transmitting connection operatively connected with one of said members.

10. A filling apparatus comprising a body member having a measuring cylinder provided therein, a weighted reciprocatory plunger coacting with said cylinder and forming therewith a pump, a supply conduit leading to the lower end of said cylinder adapted to conduct fluid to the cylinder on displacement of the plunger in one direction, a discharge conduit leading from the lower end of said cylinder to an outlet adapted to conduct the fluid out of the said cylinder on displacement of the plunger in its other direction, non-return valve means in each of said conduits, a source of supply fluid connected with said supply conduit, means to displace said weighted plunger in said first named direction from a zero displacement point, and means comprising said weighted plunger to effect displacement of the plunger in the other direction back to its zero displacement point to effect a discharge of fluid entrained in said cylinder at a rate determined by the gravitational force of the plunger and the resistance to the flow offered by said discharge conduit and outlet.

11. An apparatus for sterile filling a container with a measured quantity of a liquid preparation combining a measuring pump unit having a body member provided with a measuring cylinder, one end of said cylinder being closed and the other end open, a housing surrounding the open end of said cylinder, a measuring plunger having a head portion adapted to coact with said cylinder and the closed end thereof to form an expansible measuring chamber and a rod portion extending through the open end of the cylinder and freely through said housing, a resilient diaphragm secured to said housing and extending across the open end of the cylinder, said diaphragm also being secured to said rod portion of the said plunger, liquid inlet and discharge conduits communicating with said cylinder, means cooperating with the rod portion of the plunger for moving the head portion thereof a predetermined distance away from the closed end of the cylinder to cause the liquid preparation to enter the cylinder, other means for moving said plunger in the opposite direction to effect a discharge of the liquid from said cylinder, and means including said diaphragm for imparting a slight counter movement to said plunger at the completion of its discharging stroke.

12. An apparatus for sterile filling a container from a bulk supply of pharmaceutical preparation, combining a pump unit adapted to be connected with the bulk supply, power means for actuating said pump unit, said means including at least one rotating element whose rotation tends to create turbulent air currents about the apparatus likely to cause contamination of the preparation being processed, a substantially closed enclosure for said power means, and means comprising a grilled wall and a flanged opening in a wall of said enclosure adapting said enclosure for connection with an evacuating system.

13. In a filling apparatus of the character described the combination of fluid metering unit having a measuring cylinder provided with an end wall and a coacting reciprocable piston therein, a fluid intake and a fluid discharge conduit connected with said cylinder, said discharge conduit terminating in a relatively small bored tubular element, means to actuate the said piston a prescribed distance in one direction relative to the end wall of the cylinder to cause a charge of fluid to enter the cylinder, means for effecting actuation of the piston in the opposite direction back to said end wall to cause the charge to be expelled through the discharge conduit and said element at appreciable velocity, and means comprising the cylinder end wall for stopping the movement of the piston abruptly at the end of its discharge stroke to produce temporarily a partial vacuum in the discharge conduit and tubular element effective to hold residual fluid within the tubular element at a distance spaced from its discharge end.

14. In a filling apparatus of the character described the combination of a single cycle measuring pump, a fluid inlet and a fluid discharge conduit connected therewith, an actuator for said measuring pump operative when rendered effective to operate the pump through an intake cycle, a discharge cycle, and a pump dwell period at the end of the pump discharge cycle, and control means for said actuator including means for initiating the filling cycle and means automatically operative on completion of the pump discharge cycle to render said actuator ineffective.

15. In an apparatus of the character described the combination of a measuring pump unit; an intake and a discharge conduit connected therewith, a pump actuator including a motor and motor driven means adapted to actuate the pump on a pump intake stroke, means for actuating the pump on a pump discharge stroke, manually operable means for rendering said motor temporarily effective, and means cooperatively associated with said motor driven means for continuing said motor in operation until the completion of the pump intake stroke and thereafter to render said motor ineffective and again subject to the control of said manually operable means.

16. An apparatus for measuring a predetermined quantity of a liquid comprising a main frame member, a body member detachable therefrom and having a measuring cylinder formed therein provided with an end wall, the axis of said cylinder being disposed vertically, a piston element in said cylinder adapted for vertical reciprocation alternately away from and toward said end wall, said body member also having formed therein a vertically disposed valve cylinder adjacent said measuring cylinder; two valve seats in said valve cylinder spaced from each other and located one above the other, gravity valve means in said valve cylinder cooperating with each of said valve seats; a conduit in said body member establishing communication between the lower end of said measuring cylinder and said valve cylinder at a point therein intermediate said two valve seats, a fluid inlet port in said body communicating with said valve cylinder at a point below one of said valve seats and a fluid discharge port in said body communicating with said valve cylinder at a point above the other of said valve seats; means detachably connected to said piston element for displacing the piston upwardly relative to the cylinder to effect a filling of the displaced area of the cylinder with the liquid; additional means for displacing said piston downwardly to effect a discharge of the liquid from the measuring cylinder; and means supported by said frame member and engageable with said piston element for prescribing the upward limit of piston displacement whereby to predetermine the volume of liquid entrained by and discharged from the measuring cylinder on each complete cycle of piston movement.

17. The combination set forth in claim 16 in which said means for prescribing the upward limit of piston displacement comprises a micrometer screw graduated in units and fractional parts of the effective total capacity of said measuring cylinder, and in which said first named piston displacing means includes yieldable means operative to absorb the excess movement capable of being imparted to said piston when said micrometer screw is set to limit the piston movement to less than its maximum stroke.

FRANK J. COZZOLI.

REFERENCES CITED

The following references are of record in the file of this patent:

UNITED STATES PATENTS

| Number | Name | Date |
|---|---|---|
| 2,044,064 | Dake | June 16, 1936 |
| 2,183,318 | Burton | Dec. 12, 1939 |
| 2,252,939 | McCay | Aug. 19, 1941 |
| 1,647,232 | Kiefer | Nov. 1, 1927 |
| 952,903 | Hicks | Mar. 22, 1910 |
| 1,912,278 | Key | May 30, 1933 |
| 1,640,509 | Lowe | Aug. 30, 1927 |
| 1,995,507 | Harry et al. | Mar. 26, 1935 |
| 2,148,112 | Dillstrom | Feb. 21, 1939 |
| 2,264,898 | Bovard | Dec. 2, 1941 |
| 2,308,974 | Harper | Jan. 19, 1943 |